US009922560B2

(12) United States Patent
Kamajaya et al.

(10) Patent No.: US 9,922,560 B2
(45) Date of Patent: Mar. 20, 2018

(54) INTERACTIVE CAMERA VIEWPOINT AND ADJUSTMENT SHARING SYSTEM

(71) Applicant: INTERNATIONAL BUSINESS MACHINES CORPORATION, Armonk, NY (US)

(72) Inventors: Randy V. Kamajaya, Singapore (SG); Tien Hiong Lee, Singapore (SG); Konstantin Levinski, Singapore (SG); Harjoben Singh, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 15/069,447

(22) Filed: Mar. 14, 2016

(65) Prior Publication Data
US 2017/0263122 A1   Sep. 14, 2017

(51) Int. Cl.
G06K 9/00 (2006.01)
G08G 1/0968 (2006.01)
H04L 29/08 (2006.01)
G08G 1/0967 (2006.01)

(52) U.S. Cl.
CPC ... *G08G 1/096844* (2013.01); *G06K 9/00825* (2013.01); *G08G 1/096791* (2013.01); *H04L 67/12* (2013.01)

(58) Field of Classification Search
None
See application file for complete search history.

(56) References Cited

U.S. PATENT DOCUMENTS 8,576,069 B2    11/2013  Nadeem et al.
2010/0020169 A1*  1/2010  Jang ................ G01C 21/36
                                                 348/115
(Continued)

FOREIGN PATENT DOCUMENTS

CN    103366568 B    10/2015
WO   2014114754 A1    7/2014
WO   2014137270 A1    9/2014

OTHER PUBLICATIONS

Fujitsu, "360° Wrap-Around Video Imaging Technology," Fujitsu Graphics Solutions, 2014, 2 Pages, Fujitsu Semiconductor America, Inc.
(Continued)

*Primary Examiner* — Vikkram Bali
(74) *Attorney, Agent, or Firm* — Christopher M. Coy

(57) ABSTRACT

A first plurality of traffic data transmitted by a first client device associated with a first vehicle may be received. The received first plurality of traffic data may be stored in a database according to a license plate of the first vehicle. A second plurality of traffic data transmitted by a second client device associated with a second vehicle may be received. The license plate of the first vehicle may be identified within the received second plurality of traffic data using at least one image recognition technique. The identified license plate may be determined to be stored in the database. The first plurality of traffic data may be transmitted to the second client device based on determining the identified license plate is stored in the database. The transmitted first plurality of traffic data may be displayed within a user interface associated with the second client device.

20 Claims, 9 Drawing Sheets

(56) References Cited

U.S. PATENT DOCUMENTS

| | | | | |
|---|---|---|---|---|
| 2012/0095641 A1* | 4/2012 | Merk | ................... | G08G 1/161 701/28 |
| 2012/0221230 A1* | 8/2012 | Reilhac | ............ | G08G 1/0967 701/117 |
| 2016/0133128 A1* | 5/2016 | Koo | ................... | G06K 9/00805 701/117 |
| 2017/0164178 A1* | 6/2017 | Anjum | ................. | H04W 4/008 |

OTHER PUBLICATIONS

Jeffrey, "Samsung Creates "Transparent" Truck," Gizmag Automotive, Jun. 22, 2015, p. 1-2, http://www.gizmag.com/samsung-safety-truck-cameras-screens/38122/, Accessed on Mar. 7, 2016.

Karleader, "360 View Car Camera System," Alibaba Group, p. 1-9, Guangzhou Kingtop Electronic Technology Co., Ltd., http://karleader.en.alibaba.com/, Accessed on Mar. 10, 2016.

Mell et al., "The NIST Definition of Cloud Computing," National Institute of Standards and Technology, Sep. 2011, p. 1-3, Special Publication 800-145.

Nissan, "Around View Monitor: Getting a Virtual Bird's-Eye View on Things," Nissan Technology Magazine, Jan. 9, 2014, 1 Page.

Patra et al., "Video-Based Overtaking Assistance Now a Reality," The 40th IEEE Conference on Local Computer Networks (LCN), Oct. 26-29, 2015, 3 Pages, IEEE Computer Society, Clearwater Beach, Florida, USA.

Sjöberg et al., "Pre-Study: Real-Time Video Streaming Over VANETs for Increased Road Traffic Efficiency and Safety," FFI Transport Efficiency, Dec. 9, 2013, 11 Pages.

ZYGA, "Jump into the Screen with 360-Degree Immersive Video," Phys.org News, Feb. 27, 2008, p. 1-3, Science X Network, http://phys.org/news/2008-02-screen-degree-immersive-video.html, Accessed on Mar. 10, 2016.

* cited by examiner

INTERACTIVE CAMERA VIEWPOINT AND ADJUSTMENT SHARING SYSTEM

BACKGROUND

The present disclosure relates to the field of electrical communication, and more specifically, to video generation and processing.

A camera is an optical instrument for recording images, which may be stored locally, transmitted to another location, or both. The images may be individual still photographs or sequences of images constituting videos or movies. A camera may work with light within the visible spectrum or with other portions within the electromagnetic spectrum. A stationary camera is an optical device which creates a single image of an object or scene, and records the single image on an electronic sensor or photographic film. Cameras can be attached to objects (e.g., vehicles). A viewpoint of a camera can be displayed within an interactive user interface.

SUMMARY

According to one embodiment, a processor-implemented method is provided. The method may include receiving a first plurality of traffic data transmitted by a first client device associated with a first vehicle. The method may further include storing the received first plurality of traffic data in a database according to a license plate of the first vehicle. The method may further include receiving a second plurality of traffic data transmitted by a second client device associated with a second vehicle. The method may further include identifying the license plate of the first vehicle within the received second plurality of traffic data using at least one image recognition technique. The method may further include determining the identified license plate is stored in the database. The method may further include transmitting the first plurality of traffic data to the second client device based on determining the identified license plate is stored in the database. The method may further include displaying the transmitted first plurality of traffic data within a UI associated with the second client device.

According to another embodiment, a computer system is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a first plurality of traffic data transmitted by a first client device associated with a first vehicle. The method may further include storing the received first plurality of traffic data in a database according to a license plate of the first vehicle. The method may further include receiving a second plurality of traffic data transmitted by a second client device associated with a second vehicle. The method may further include identifying the license plate of the first vehicle within the received second plurality of traffic data using at least one image recognition technique. The method may further include determining the identified license plate is stored in the database. The method may further include transmitting the first plurality of traffic data to the second client device based on determining the identified license plate is stored in the database. The method may further include displaying the transmitted first plurality of traffic data within a UI associated with the second client device.

According to yet another embodiment, a computer program product is provided. The computer program product may include one or more computer-readable storage devices and program instructions stored on at least one of the one or more tangible storage devices, the program instructions executable by a processor. The computer program product may include program instructions to receive, by a processor, a first plurality of traffic data transmitted by a first client device associated with a first vehicle. The computer program product may include program instructions to store the received first plurality of traffic data in a database according to a license plate of the first vehicle. The computer program product may include program instructions to receive a second plurality of traffic data transmitted by a second client device associated with a second vehicle. The computer program product may include program instructions to identify the license plate of the first vehicle within the received second plurality of traffic data using at least one image recognition technique. The computer program product may include program instructions to determine the identified license plate is stored in the database. The computer program product may include program instructions to transmit the first plurality of traffic data to the second client device based on determining the identified license plate is stored in the database. The computer program product may include program instructions to display the transmitted first plurality of traffic data within a UI associated with the second client device.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
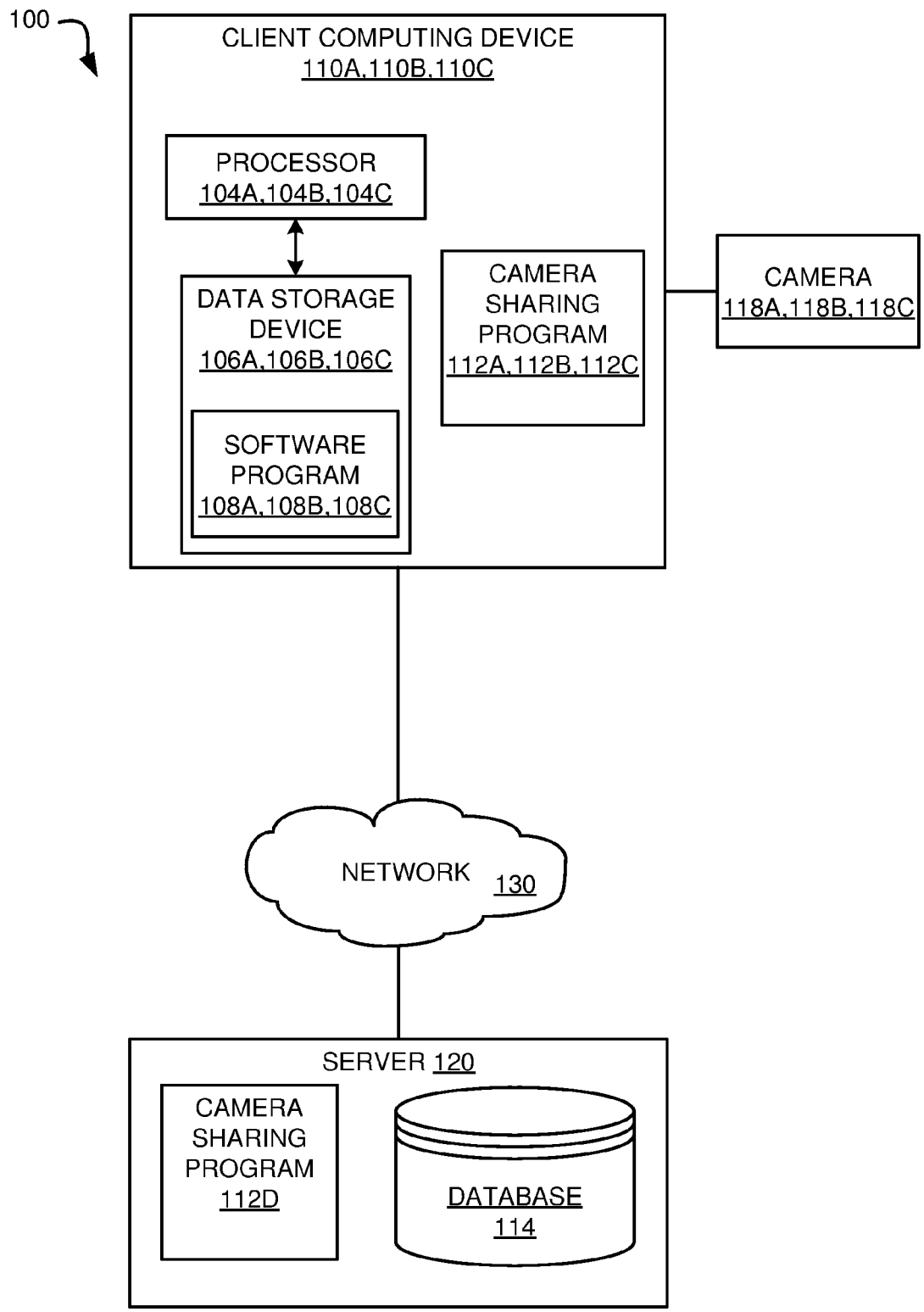
FIG. 1 is an exemplary networked computer environment, in accordance with one embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present disclosure relate to the field of electrical communication, and more specifically, to video generation and processing. While the present disclosure is not necessarily limited to such applications, various aspects of the current disclosure may be appreciated through a discussion of various examples using this context. The following described exemplary embodiments provide a system, method, and program product to, among other things, view traffic conditions by a camera (e.g., digital camera or camera attached to a car) associated with a car proximal (e.g., a predefined distance, a user-defined distance, or thirty yards) to a geographic location of the car. Therefore, the present embodiment has the capacity to improve the technical field of video generation and processing by automatically displaying traffic conditions within a proximity of a geographic location in order for a user to make a more informed decision for choosing a route. More specifically, the present embodiment may allow for more efficient time management by a user safely avoiding traffic congestion.

When driving on the road during times of high traffic congestion (e.g. rush hour traffic), seeing multiple cars ahead of one's own car can be difficult, especially when a large vehicle (e.g., a bus or truck) is ahead. This obstruction can impair a driver's judgment to safely bypass the large vehicle. For example, the obstruction can affect a driver's decision to switch lanes when there are additional factors causing the obstruction, such as a road block/work activity (e.g., tree pruning, road construction, or vehicle breakdown). Bypassing an obstruction can be accomplished by switching lanes; although, bypassing can be dangerous when multiple drivers decide to switch lanes at once, especially when bypassing drivers are in a blind spot of another bypassing driver. Such traffic situations on expressways can be common, thereby increasing the likelihood of causing an accident. Therefore, it may be advantageous to, among other things, utilize an adjustable camera attached to a vehicle as a solution to decrease the likelihood of causing accidents.

According to at least one embodiment, a camera attached to a vehicle can be communicatively coupled to a cellular phone, laptop, or desktop. A driver, or user, can communicate with their vehicle's attached camera via a mobile application. This mobile application can connect to the camera via a wireless connection, then send commands to adjust (e.g., extend or retract) the camera as well as transmit a view of that camera for display within a user interface (UI), such as transmitting to the user's mobile phone so that the user can view road conditions.

The mobile application can also be configured to transmit and store the camera's viewpoint in a database (e.g. the cloud) to be used for multiple purposes, such as recording a particular scenic route or sharing a current driving view on a social media platform. A camera can also transmit and receive a current view from vehicles adjacent to or within a certain proximity of the user's vehicle. Being capable of observing a second vehicle's camera feed can be useful when a user's field of view is obstructed. For example, approaching road conditions can be observed by making use of the camera feed of an advanced vehicle on a roadway.

According to at least one embodiment, each camera can be attached with a signal transmitter device (e.g., WIFI/4G) capable of continuously broadcasting a signal. The power used to operate the camera can be obtained through a direct power connection to the vehicle on which the camera is attached. This signal can be directly transmitted to a database, which can then keep the current recorded view. Additionally, the system can erase old records when the recording satisfies a threshold.

When another vehicle comes within a certain distance behind the user's vehicle, the approaching vehicle's camera can automatically identify and recognize the user's vehicle license plate by using known image detection methods. The camera can then send a request signal to the database in order to retrieve the current recorded view of the user's attached camera. This recording can be indexed according to the vehicle license plate. This may also be used when a large vehicle is obstructing a view and adjusting the approaching vehicle's camera might not be enough to overcome the height of the large vehicle.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the foregoing detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the foregoing description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The following described exemplary embodiments provide a system, method, and program product for viewing traffic conditions within a proximity of a vehicle. The automated system may collect traffic data from a field of view of an associated vehicle in the form of a digital recording. The digital recording can be displayed within an UI.

Referring to FIG. 1, an exemplary networked computer environment 100 is depicted, in accordance with one embodiment. The networked computer environment 100 may include a client computing device 110A-C and a server 120 interconnected via a communication network 130. According to at least one implementation, the networked computer environment 100 may include a plurality of client computing devices 110A-C and servers 120, only one of each being shown for illustrative brevity.

The communication network 130 may include various types of communication networks, such as a wide area network (WAN), local area network (LAN), a telecommunication network, a wireless network, a public switched network and/or a satellite network. The communication network 130 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

The client computing devices 110A-C may include processors 104A-C and data storage devices 106A-C that are enabled to host software programs 108A-C, camera sharing program 112A-C, and may communicate with the server 120 via the communication network 130, in accordance with one embodiment of the invention. The client computing devices 110A-C may be communicatively coupled (e.g., wirelessly, by WIFI, by 4G, or electrically connected) to cameras 118A-C. The cameras 118A-C may be digital cameras capable of being remotely controlled by the client devices 110A-C. The client computing devices 110A-C may be, for example, a mobile device, a telephone, a personal digital assistant, a netbook, a laptop computer, a tablet computer, a desktop computer, a camera attached to a vehicle, a camera, or any type of computing device capable of running a program and accessing a network. Hereinafter, a client device 110A-C can be referred to as a camera, a digital camera, and a camera attached to a vehicle. As will be discussed with reference to FIG. 7, the client computing devices 110A-C may include internal components 702a and external components 704a, respectively.

The server computer 120 may be a laptop computer, netbook computer, personal computer (PC), a desktop computer, or any programmable electronic device capable of hosting a camera sharing program 112D, database 114, and communicating with the client computing device 110A-C via the communication network 130, in accordance with embodiments of the invention. The server 120 may also operate in a cloud computing service model, such as Software as a Service (SaaS), Platform as a Service (PaaS), or Infrastructure as a Service (IaaS). The server 120 may also be located in a cloud computing deployment model, such as a private cloud, community cloud, public cloud, or hybrid cloud.

According to the present embodiment, the camera sharing program 112A-D may be a program capable of receiving a first set of traffic data and a second set of traffic data collected by a first client device 110A (e.g., a first camera) and a second client device 110B (e.g., a second camera) from the processors 104A, 104B of the first client device 110A and the second client device 110B, respectively, and identifying a license plate within the second set of traffic data. Furthermore, the camera sharing program 112A-D may determine that the identified license plate is associated with the first set of traffic data, which is stored in a server in database 114 and the software program 108A-C. Moreover, the camera sharing program 112A-D may transmit the first set of traffic data to client device 110B for display within a UI. Additionally, the camera sharing program 112A-D is explained in further detail below with respect to FIGS. 2-6.

Figure 2:
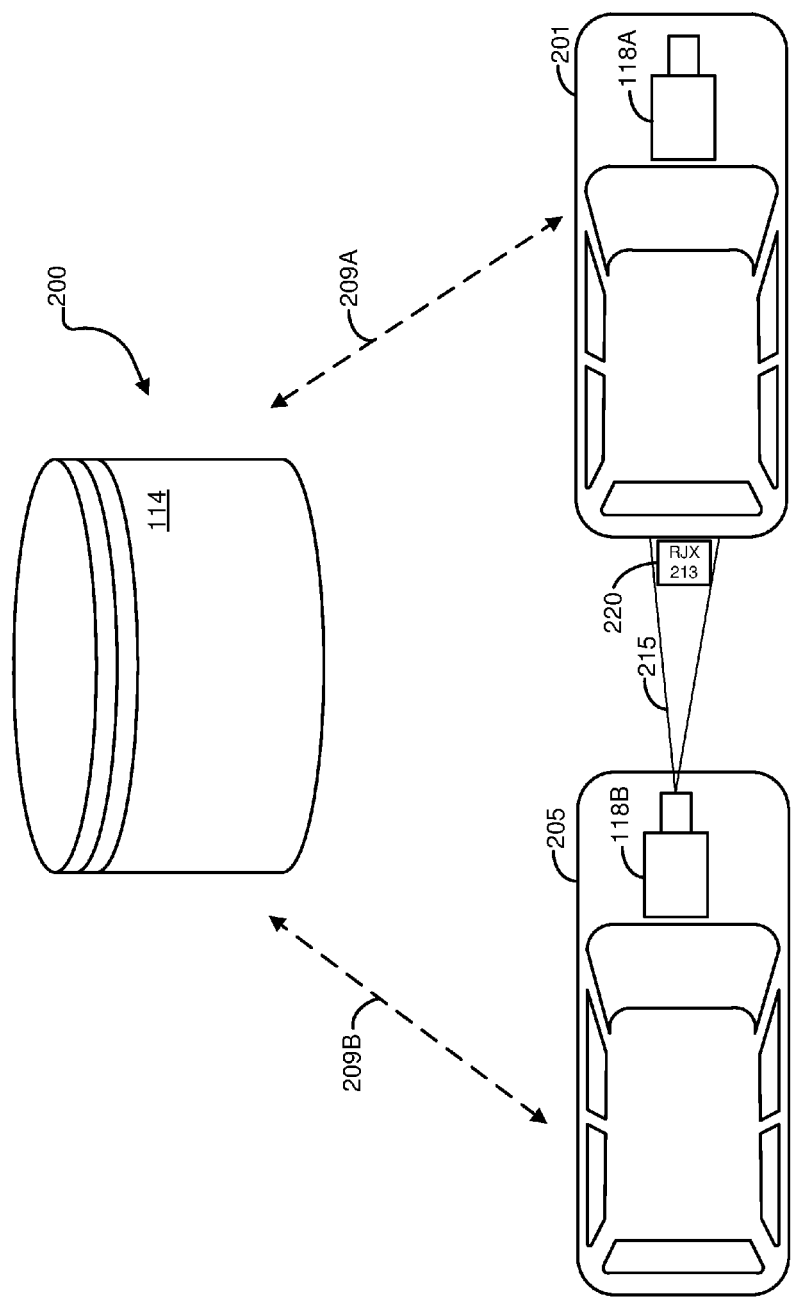
FIG. 2 illustrates an example scenario of a client device receiving a first set of traffic data transmitted by a server, according to various embodiments.

Referring now to FIG. 2, an example scenario 200 of a client device 110B (FIG. 1) receiving a first set of traffic data transmitted by a database 114 is illustrated, according to various embodiments. A camera 118A can be attached to a first vehicle 201. The camera 118A can be mounted, strapped down, bolted, welded, or attached in another way to the first vehicle 201. According to at least one embodiment, the camera 118A may be integrated into the client device 110A-C (FIG. 1). A camera 118B can be attached to a second vehicle 205 in a substantially similar way as the camera 118A is attached to the first vehicle 201. A viewpoint 215 of the camera 118A and the camera 118B can be manually or automatically adjusted. For example, the cameras 118A, 118B can be electronically gyrated, rotated, extended, or retracted and repositioned to change the viewpoint 215. The cameras 118A, 118B can be adjusted manually by a user interacting with an interactive UI and selecting a new direction for the viewpoint 215 of the cameras 118A, 118B. Furthermore, the cameras 118A, 118B can be readjusted automatically by known image recognition methods. For example, the cameras 118A, 118B might be continuously readjusted until the camera 118A, 118B recognizes a license plate 220 (i.e., RJX 213). Known image recognition methods can include object recognition, image segmentation, motion detection, and automatic number plate recognition, etc., or a combination of the known image recognition methods.

According to at least one embodiment, the first vehicle 201 can include an array of cameras 118A-C (e.g., more than two cameras) that are attached together. The first vehicle 201 including an array of cameras 118A-C can improve the likelihood of a user being able to identify obstructions that are causing a traffic congestion. For example, the user can check the user's blind spot when the first vehicle 201 includes at least one camera (e.g., 118A) directed to the user's blind spot. An additional use of this array of cameras 118A-C may be to serve as a backup in case the camera (e.g., 118A) malfunctions, such that the array of cameras 118A-C can be repositioned, and another camera (e.g., 118B) can then serve as a replacement for the camera (e.g., 118A).

According to at least another embodiment, the camera 118A may collect a first set of traffic data within a proximity of the first vehicle 201. The first set of traffic data can be in the form of digital images (e.g., video recording) that can include sound. The first vehicle 201 can be communicatively coupled to a database 114 by a communication link 209A, whereby the communication link 209A may be a network 130 (FIG. 1). The first set of traffic data can be electronically transmitted to the database 114. Then the database 114 can store the first set of traffic data according to the text (i.e. RJX 213) of a license plate 220 of the first vehicle 201 for extended periods of time. The database 114 can also erase the oldest portions of the first set of traffic data. Furthermore, the database 114 may erase portions of the first set of traffic data in response to a timestamp exceeding a time threshold (e.g., five seconds, a minute, or an hour). The value of the timestamp can be set when the first set of traffic data is initially stored in the database 114. Similarly, the time threshold can be adjusted to account for an increasingly high amount of incoming sets of traffic data.

The database 114 can store one or more sets of traffic data transmitted by one or more client devices 110A-C (FIG. 1). The cameras 118A-C may collect traffic data and then transmit the collected traffic data to the client devices 110A-C (FIG. 1). A database manager of the database 114 may organize the sets of traffic data within the database 114 according to a particular vehicle's (e.g., 201) license plate (e.g., 220). Furthermore, the database 114 may be communicatively coupled to the client device 110B (FIG. 1) by a communication link 209B, whereby the communication link 209B may be a network 130 (FIG. 1). The camera 118B may collect a second set of traffic data within a viewpoint 215, whereby the second set of traffic data may also be transmitted to the database 114. The database 114 can then perform known image recognition methods on the second set of traffic data in order to recognize the license plate 220 of the first vehicle 201. Thereafter, the database 114 can transmit the first set of traffic data to the client device 110B (FIG. 1) for display within a UI associated with the second vehicle 205. The viewpoint 215 of the camera 118A can be viewed within the UI. According to yet another embodiment, a user of the second vehicle 205 might utilize embodiments of the present disclosure to bypass the first vehicle 201.

Figure 3:
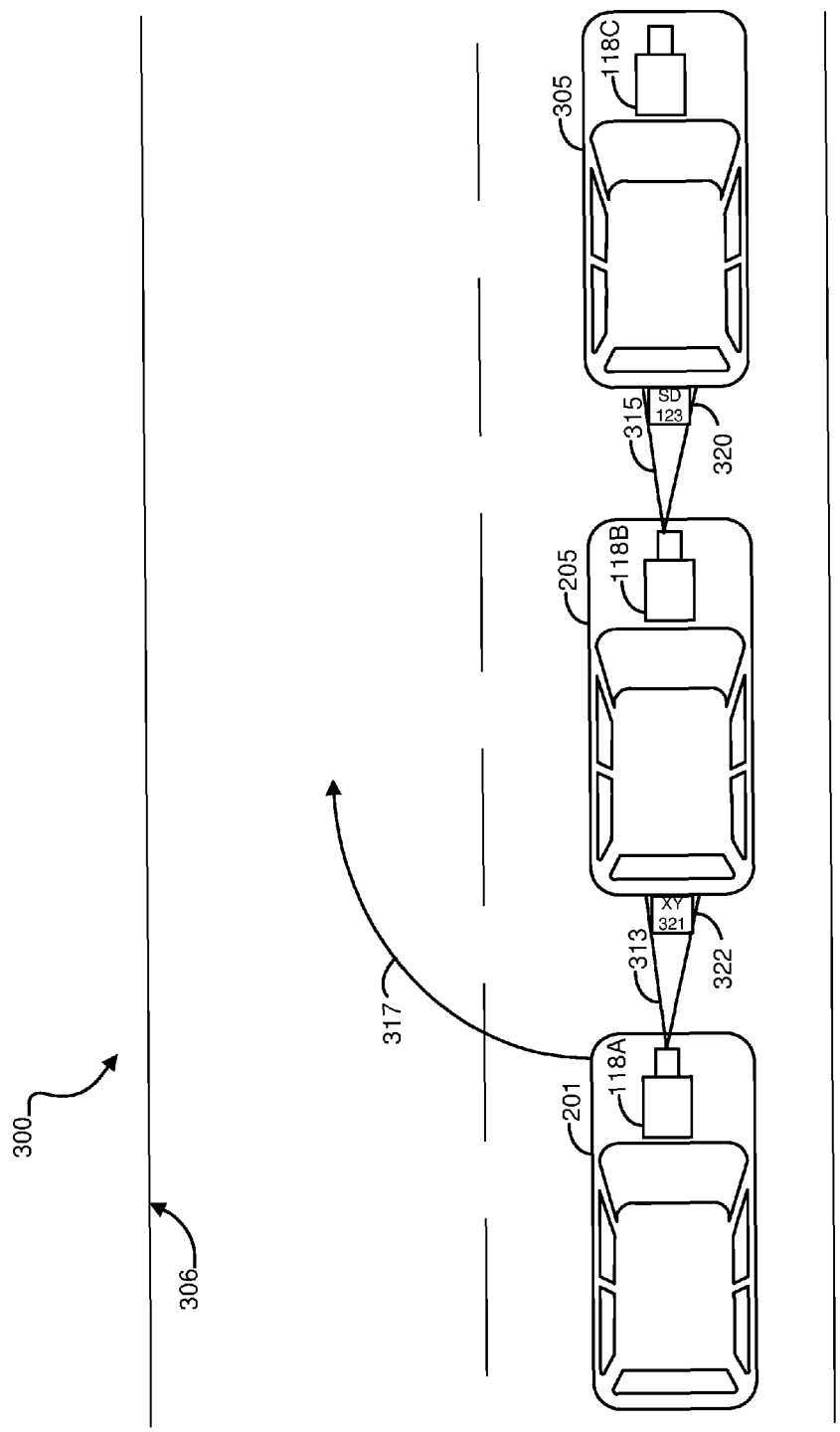
FIG. 3 illustrates an example scenario of a first vehicle bypassing a second vehicle and a third vehicle in response to receiving a set of traffic data from a server, according to various embodiments.

Referring now to FIG. 3, an example scenario 300 of a first vehicle 201 bypassing a second vehicle 205 and a third vehicle 305 on a road 306 is depicted, according to various embodiments. The first vehicle 201, second vehicle 205, and third vehicle 305 can include a client device 110A (FIG. 1), client device 110B (FIG. 1), and a client device 110C (FIG. 1), respectively. Each of the cameras 118A-C may collect a set of traffic data within a proximity of each of the vehicles 201, 205, and 305. The cameras 118A, 118B may collect traffic data within their camera's 118A, 118B viewpoint 313, 315. According to at least one embodiment, a user within the first vehicle 201 may view a viewpoint (not shown) of the camera 118C within a UI displayed by client device 110A (FIG. 1) located in the first vehicle 201.

According to an exemplary scenario, an obstruction (e.g. an accident) may have occurred in front of the third vehicle 305, thereby causing a congestion on the road 306. The third vehicle 305 and the second vehicle 205 may be obstructing the view of the accident from a user of the first vehicle 201. In order to learn of the congestion source, the driver of the first vehicle 201 might want to bypass the congestion by overtaking the second vehicle 205 and the third vehicle 305. The camera 118C may collect a third set of traffic data including video footage of the obstruction. The client device 110C (FIG. 1) may transmit the third set of traffic data to a data repository, such as database 114 (FIG. 1). The database 114 (FIG. 1) may store the third set of traffic data according to the text (i.e., SD 123) of the third vehicle's 305 license plate 320. The camera 118B may collect a second set of traffic data within the viewpoint 315. The client device 110B (FIG. 1) may transmit the second set of traffic data to the database 114 (FIG. 1). The database 114 (FIG. 1) may store the transmitted second set of traffic data according to the text (i.e., XY 321) of the second vehicle's 205 license plate 322. The database 114 (FIG. 1) may then recognize the license plate 320 of the third vehicle 305 within the second set of traffic data. Furthermore, the database 114 (FIG. 1) may determine the position of the second vehicle 205 relative to the third vehicle 305. Moreover, the camera 118A may collect a first set of traffic data within the viewpoint 313 and then transmit the first set of traffic data to the database 114 (FIG. 1) as discussed in FIG. 2. Additionally, the database 114 (FIG. 1) may store the first set of traffic data according to the first vehicle's 201 license plate (not shown). Furthermore, the database 114 (FIG. 1) may determine the position of the first vehicle 201 relative to the second vehicle 205 and the third vehicle 305.

According to another embodiment, an option for a user of the first vehicle 201 to retrieve the second set of traffic data and the third set of traffic data can be displayed within a UI. The user of the first vehicle 201 can then choose to view the third set of traffic data within the UI. Moreover, the user can determine what is causing the congestion and, in response to viewing the third set of traffic data, make an informed decision as to whether or not to bypass the second vehicle 205 and the third vehicle 305. The user of the first vehicle 201 can also control the camera 118C by remotely adjusting the position and the direction of the viewpoint (not shown) of the camera 118C. According to yet another embodiment, an option may be presented to the user to display the second set of traffic data simultaneously with the third set of traffic data within the UI. The user can view both the second set of traffic data and the third set of traffic data to make a more informed decision as to whether bypassing the vehicle (e.g., 205) is safe. The user can also control the camera 118B of the second vehicle 205. The user can determine a safe route 317 in which to bypass the second vehicle 205 and the third vehicle 305. Additionally, the UI can display one or more alternate route options in order to bypass the congestion. The one or more alternate route options can be determined by analyzing traffic data received by the database 114 (FIG. 1) by one or more cameras 118A-C attached to vehicles (e.g., vehicles 205 and 305) utilizing the camera sharing program 112A-D (FIG. 1) within a proximity of the first vehicle 201.

According to yet another embodiment, there may not be any congestion present on the road 306 and the third vehicle 305 may be travelling at a speed far lower than the speed limit. The user of the first vehicle 201 might want to bypass the third vehicle 305 by entering a lane specified for oncoming traffic. Since the user's view may be obstructed, the user might be unable to estimate a needed space available for overtaking the second vehicle 205 and the third vehicle 305. In this situation, the user can view the third set of traffic data within the UI in order to determine a safe opportunity in which to enter the lane specified for oncoming traffic. The user can then return to the initial lane of traffic quickly and safely when the user attempts to overtake the second vehicle 205 and the third vehicle 305 without endangering the either vehicle 205, 305 and/or any oncoming traffic.

Figure 4:
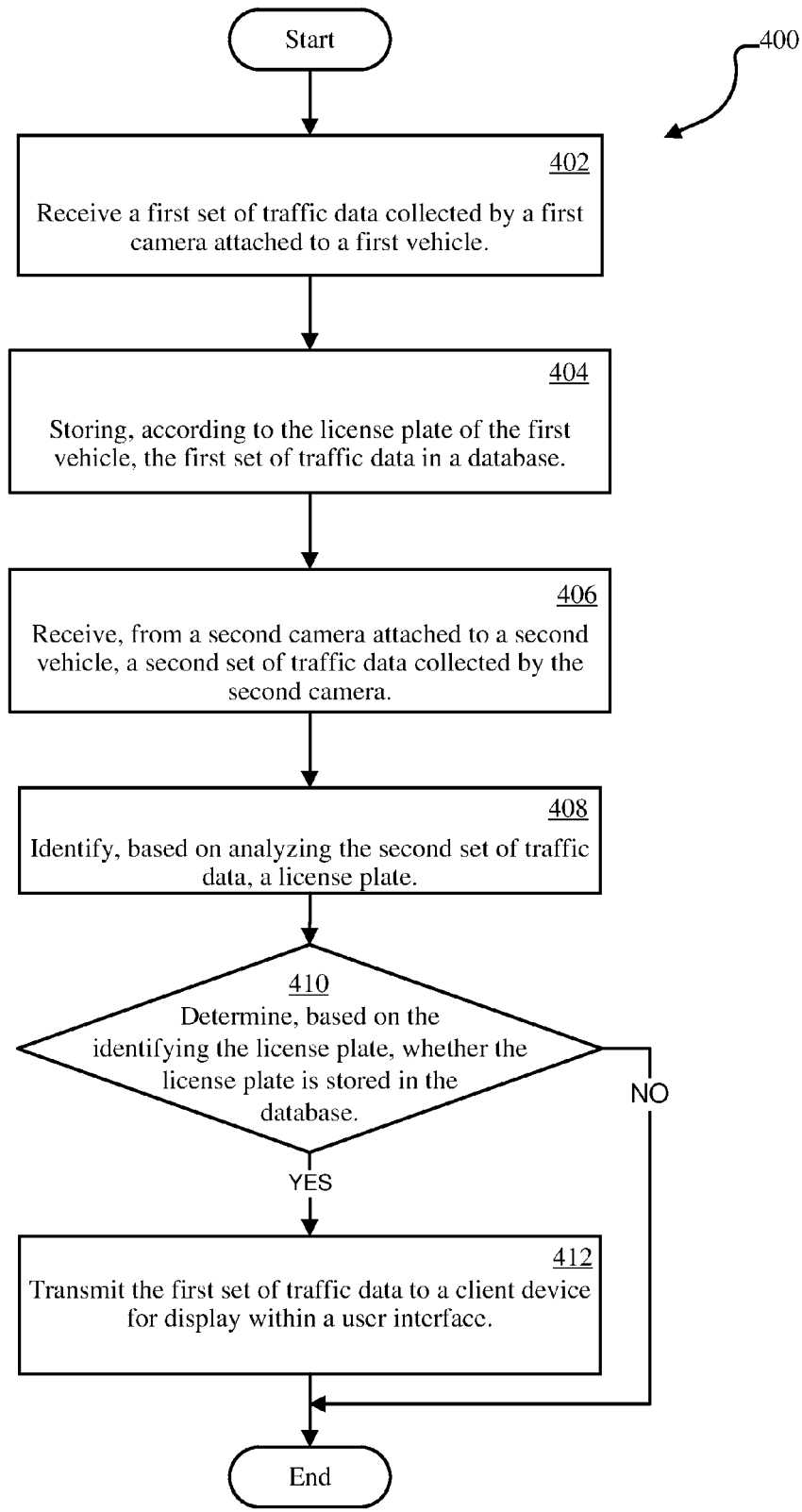
FIG. 4 illustrates an operational flowchart of a dynamic traffic data collection process, according to various embodiments.

Referring now to FIG. 4, an operational flowchart of a dynamic traffic data collection process 400 is depicted, according to various embodiments. At 402, the camera sharing program 112A-D (FIG. 1) receives a first set of traffic data collected by a first camera 118A (FIG. 1) attached to a first vehicle (e.g., 201 (FIG. 2)). The first set of traffic data can be a digital representation of a viewpoint 215 (FIG. 2) of the camera 118A (FIG. 1) within a proximity (e.g., thirty yards) of a first vehicle 201 (FIG. 2). The proximity can depend on the capabilities and specification of the first camera's 118A (FIG. 1) detection. The first set of traffic data can be in the form of digital images or video recordings. Furthermore, the first set of traffic data can also include sound.

Then, at 404, the camera sharing program 112A-D (FIG. 1) stores the first set of traffic data in a data repository (e.g., database 114 (FIG. 1)). The client device 110A (FIG. 1) may transmit a license plate (e.g., 220 (FIG. 2)) number associated with the first vehicle 201 (FIG. 2) to the database 114 (FIG. 1). Additionally, the first set of traffic data may be stored/indexed within the database 114 (FIG. 1) according to the license plate 220 (FIG. 2) of the first vehicle 201 (FIG. 2). The client device 110A (FIG. 1) can transmit the first set of traffic data to the database 114 (FIG. 1). Moreover, the client device 110A (FIG. 1) can be communicatively coupled (e.g. by 4G, WIFI, or Bluetooth) to the database 114 (FIG. 1). Furthermore, the database 114 (FIG. 1) can comprise one or more sets of traffic data transmitted by one or more of the client devices 110A-C (FIG. 1) that are stored within the database 114 (FIG. 1) according to the license plate (e.g., 220 (FIG. 2)) number of the vehicles (e.g., 201 (FIG. 2)), as discussed with reference to FIGS. 2 and 3.

Next, at 406, the camera sharing program 112A-D (FIG. 1) receives a second set of traffic data collected by a second camera 118B (FIG. 1) on a second vehicle 205 (FIG. 2). The second camera 118B (FIG. 1) can be attached to the second vehicle 205 (FIG. 2) in a substantially similar way as the first camera 118A (FIG. 1) is attached to the first vehicle 201 (FIG. 2). The second set of traffic data can be stored within the database 114 (FIG. 1) according to the license plate (e.g., 322 (FIG. 3)) of the second vehicle 205 (FIG. 2). The second camera 118B (FIG. 1) can be adjusted manually by a user interacting with an interactive UI and by selecting a new direction for the viewpoint 215 (FIG. 2) of the second camera 118B (FIG. 1) to face (e.g., the direction of the first vehicle's 201 (FIG. 2) license plate 220 (FIG. 2)).

Then, at 408, the camera sharing program 112A-D (FIG. 1) identifies a license plate (e.g., 320 (FIG. 3)) based on the received second set of traffic data. Identifying the license plate 320 (FIG. 3) can be accomplished by using known image recognition methods, such as object recognition, image segmentation, motion detection, and automatic number plate recognition. The identified license plate 320 (FIG. 3) can be matched with a list of one or more license plates 320, 322 (FIG. 3) that are associated with a set of traffic data within the database 114 (FIG. 1).

Next, at 410, the camera sharing program 112A-D (FIG. 1) determines whether the license plate 320 (FIG. 3) is stored in the database 114 (FIG. 1). According to at least one embodiment, the dynamic traffic data collection process 400 may continue along the operational flowchart if the identified license plate 320 (FIG. 3) is stored within the database 114 (FIG. 1). The camera sharing program 112A-D (FIG. 1) program can determine whether the license plate 320 (FIG. 3) is stored in the database 114 (FIG. 1) by searching the database 114 (FIG. 1) within the server 120 (FIG. 1) for the identified license plate 320 (FIG. 3). If the camera sharing program 112A-D (FIG. 1) determines that the identified license plate 320 (FIG. 3) is stored within the database 114 (FIG. 1) (step 410, "YES" branch), the camera sharing program 112A-D (FIG. 1) may continue to transmit the first set of traffic data to a client device 110B (FIG. 1) at step 412. If the camera sharing program 112A-D (FIG. 1) determines the identified license plate 320 (FIG. 3) is not stored within the database 114 (FIG. 1) (step 410, "NO" branch), the dynamic traffic data collection process 400 may terminate.

Then, at 412, the camera sharing program 112A-D (FIG. 1) transmits the first set of traffic data to a client device (e.g., 110A (FIG. 1)) for display within a UI. Furthermore, the camera sharing program 112A-D (FIG. 1) can transmit the second set of traffic data to another client device (e.g., 110B (FIG. 1)). The UI can be an interactive screen associated with the client device (e.g., 110A (FIG. 1)). For example, the user can adjust a viewpoint 215 (FIG. 2) of the camera 118A (FIG. 1) within the UI. Additionally, the UI can be integrated into the second vehicle 205 (FIG. 2) by displaying the UI on client device 110B (FIG. 1). Furthermore, the UI can be voice activated. The UI can be a screen on a client device 110A, 110C (FIG. 1) not within the second vehicle 205 (FIG. 2). Additionally, the client device 110A, 110C (FIG. 1) may be located away (e.g., miles) from the second vehicle 205 (FIG. 2). For example, a parent can monitor a child's driving habits from home by watching the video feed of a camera attached to the parent's vehicle (e.g., 201 (FIG. 2)) through a smartphone or tablet.

As an additional example explaining embodiments of the present disclosure with reference to FIG. 4, a camera 118A (FIG. 1) may be attached (e.g., mounted or built-in) to a first vehicle 201 (FIG. 2) capable of collecting traffic data in the form of video footage. The camera 118A (FIG. 1) may also be adjusted electronically (e.g., extended/retracted) in response to a user interacting with the UI. Furthermore, the camera 118A (FIG. 1) can be communicatively connected to a mobile application via a wireless connection. Then, the camera 118A (FIG. 1) can collect the traffic data and then client device 110A (FIG. 1) can transmit the collected traffic data to a database 114 (FIG. 1). A camera 118B (FIG. 1) may be attached to a second vehicle 205 (FIG. 2) which may be located directly behind the first vehicle 201 (FIG. 2). The license plate 220 (FIG. 2) of the first vehicle 201 (FIG. 2) can be identified by the camera 118B (FIG. 1) or the database 114 (FIG. 1) performing known image recognition methods on a received second set of traffic data. The traffic data collected by the camera 118A (FIG. 1) can be retrieved from the database 114 (FIG. 1) in response to the license plate 220 (FIG. 2) of the first vehicle 201 (FIG. 2) being recognized and the retrieved traffic data can then be displayed within a UI. This traffic data can be a current view of the camera 118A (FIG. 1). Furthermore, the user may control the camera 118A (FIG. 1) via an interactive UI on a built-in mobile application. Additionally, the UI can display multiple views (e.g., viewpoints 313, 315 (FIG. 3)) of cameras 118A-C (FIG. 1) simultaneously. For example, four different views from an array of cameras 118A-C (FIG. 1) together capturing a three hundred sixty degree view within a pre-defined distance of the first vehicle 201 (FIG. 2) may be displayed within the UI.

Figure 5:
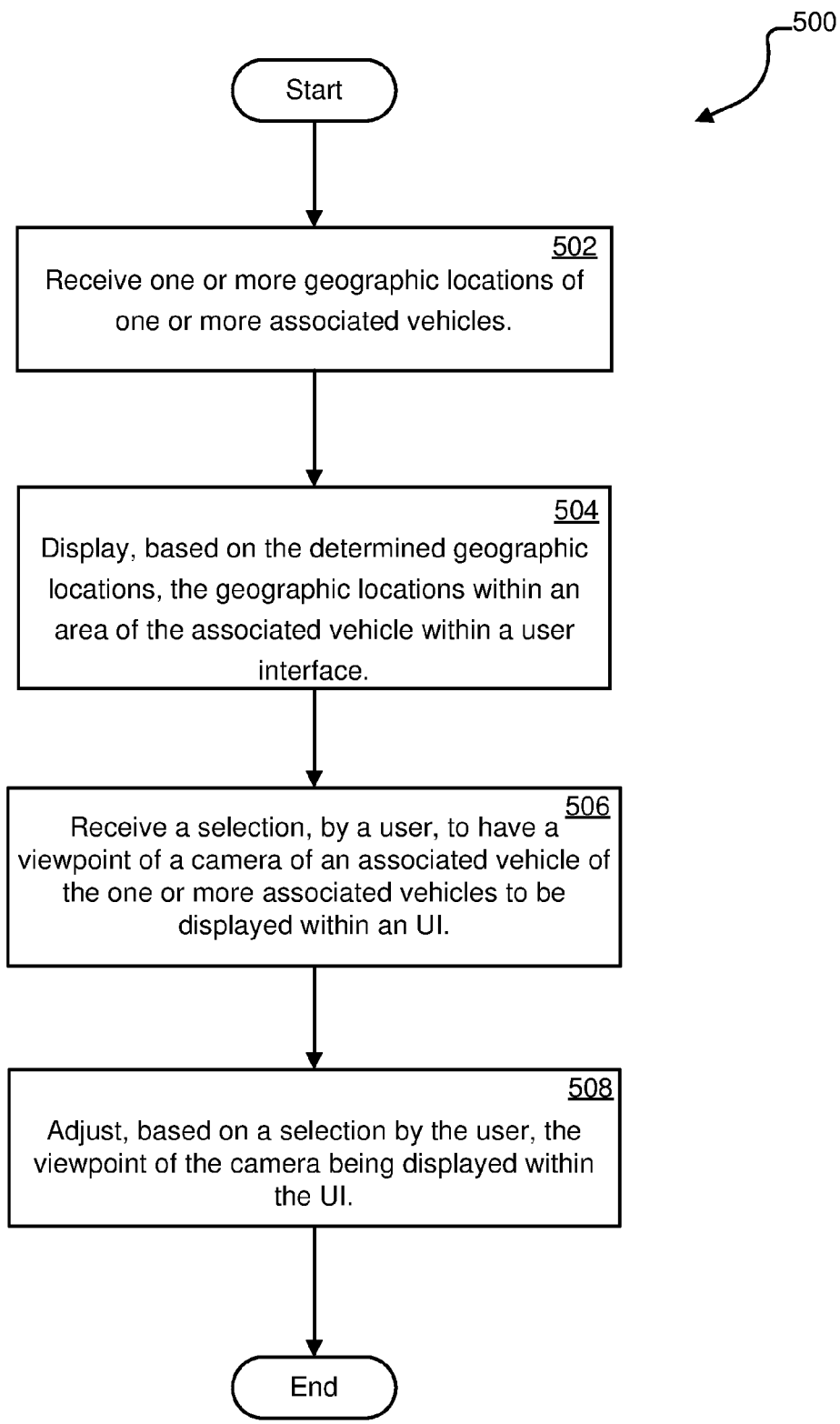
FIG. 5 illustrates an operational flowchart of an interactive camera adjustment process, according to various embodiments.

Referring now to FIG. 5, an operational flowchart of an interactive camera adjustment process 500 is depicted, according to various embodiments. At 502, the camera sharing program 112A-D (FIG. 1) receives one or more geographic locations of one or more vehicles 201, 205 (FIG. 2) that have been transmitted by one or more client devices 110A-C (FIG. 1). Each of the one or more vehicles 201, 205 (FIG. 2) can include attached cameras 118A-C (FIG. 1). The geographic locations can be determined by performing known image analysis methods on a set of traffic data. For example, a geographic location can be determined by recognizing one or more street signs within the traffic data and then calculating the location of a vehicle 201, 205 (FIG. 2) with respect to the street signs. Furthermore, the geographic location of the first vehicle 201 (FIG. 2) can be determined relative to a geographic location of the second vehicle 205 (FIG. 2).

Then, at 504, the camera sharing program 112A-D (FIG. 1) displays the geographic locations of the one or more vehicles 201, 205 (FIG. 2) within a UI. The UI can be displayed by a client device 110A-C (FIG. 1) of the one or more associated vehicles 201, 205 (FIG. 2). Moreover, the displayed geographic locations can be within a proximity of the associated vehicle 201, 205 (FIG. 2). Additionally, the proximity of the area (e.g. one block, one hundred feet, or a mile from the vehicle 201, 205 (FIG. 2)) can be set by a user.

Moreover, the one or more vehicles 201, 205 (FIG. 2) can be displayed as colored dots within the UI.

Next, at 506, the camera sharing program 112A-D (FIG. 1) receives a selection for a viewpoint (e.g., 313 (FIG. 3)) of a camera (e.g., 118A (FIG. 1)) for display within the UI made by the user. The selection could be made in response to a touch activated screen (e.g., the UI is a touch screen and a user presses the screen where a colored dot representing the vehicle (e.g., 201 (FIG. 2)) was located within the UI). Furthermore, the vehicle (e.g., 201 (FIG. 2)) can include an array of cameras 118A-C (FIG. 1). The user could view each of the cameras 118A-C (FIG. 1) within the UI as a multi-screen view, or the user could scroll between viewpoints 313, 315 (FIG. 3) of each of the cameras 118A-C (FIG. 1).

Then, at 508, the camera sharing program 112A-D (FIG. 1) adjusts the viewpoint 313, 315 (FIG. 3) of the camera 118A-C (FIG. 1) that is being displayed within the UI. The user may interact with the UI (e.g., by touch screen) to adjust the viewpoints 313, 315 (FIG. 3) of the cameras 118A-C (FIG. 1). The user could adjust one or more of the arrays of cameras 118A-C (FIG. 1) viewpoints 313, 315 (FIG. 3) when the UI is in multiscreen view. Adjusting the viewpoints 313, 315 (FIG. 3) can include physically extending, retracting, rotating, and gyrating the cameras 118A-C (FIG. 1). Furthermore, this can be used when the user wants to change lanes safely in order to bypass traffic congestion.

Figure 6:
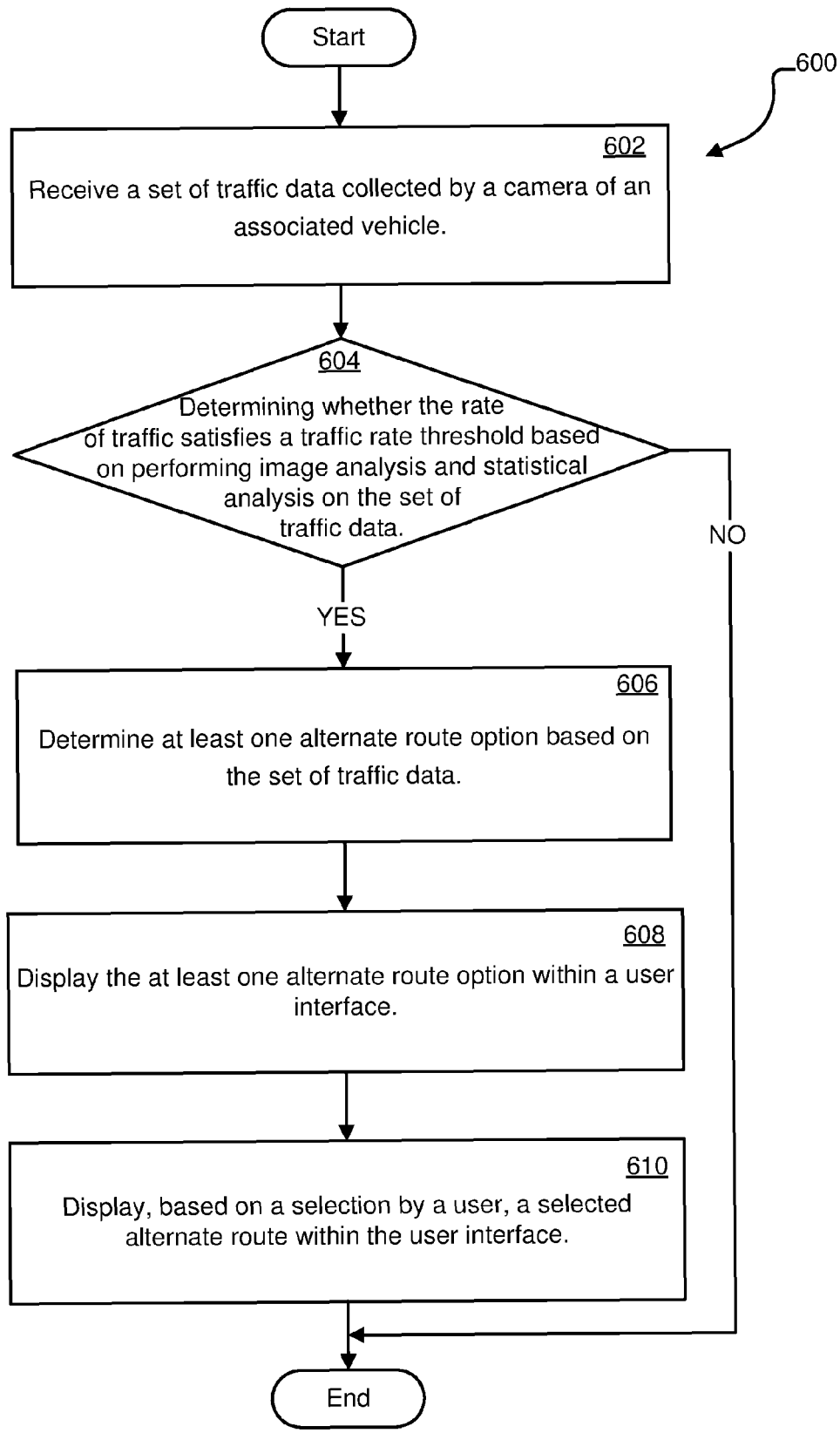
FIG. 6 illustrates an operational flowchart of a dynamic route generation process, according to various embodiments.

Referring now to FIG. 6, an operational flowchart of a dynamic route generation process 600 is depicted, according to various embodiments. At 602, the camera sharing program 112A-D (FIG. 1) receives a set of traffic data that may be collected by cameras 118A-C (FIG. 1) associated a vehicle (e.g., 201 (FIG. 2)). Traffic data can be collected within a proximity (e.g., thirty yards) of the vehicle (e.g., 201 (FIG. 2)) based on the detection capabilities and specifications of the cameras 118A-C (FIG. 1). The traffic data can be in the form of digital images or video recordings. Additionally, the digital images and video recordings that compose the traffic data can include sound data. Furthermore, the cameras 118A-C (FIG. 1) can be mounted, strapped down, bolted, welded, or attached in another way to the vehicle (e.g., 201 (FIG. 2)).

Then, at 604, the camera sharing program 112A-D (FIG. 1) determines whether the average rate of traffic satisfies a traffic rate threshold. According to one embodiment, the dynamic route generation process 600 may continue along the operational flowchart, if the received set of traffic data satisfies a traffic rate threshold. If the camera sharing program 112A-D (FIG. 1) determines the received set of traffic data satisfies a traffic rate threshold (step 604, "YES" branch), the camera sharing program 112A-D (FIG. 1) may continue to determine at least one alternate route at step 606. If the camera sharing program 112A-D (FIG. 1) determines the received set of traffic data does not satisfy a traffic rate threshold (step 604, "NO" branch), the dynamic route generation process 600 may terminate.

Whether the average rate of traffic satisfies the traffic rate threshold can be determined based on performing known image analysis methods, and/or known statistical analysis methods on the received set of traffic data. The known image analysis methods can include object recognition, image segmentation, motion detection, and automatic number plate recognition. The camera sharing program 112A-D (FIG. 1) can determine a rate of speed of one or more vehicles 201, 205 (FIG. 2) on a road 306 (FIG. 3) at a particular time of day by analyzing the received set of traffic data. The determined rate of the one or more vehicles 201, 205 (FIG. 2) can be compared to a historical record that includes a rate of the vehicle's 201, 205 (FIG. 2) speed on the road 306 (FIG. 3) at the particular time of day from previously received sets of traffic data. The known statistical analysis methods can be performed on the historical records which may include factors that could be contributing to the average rate of traffic of vehicles 201, 205 (FIG. 2) included in the set of traffic data. The factors can include weather and nearby events (e.g., marathons, parades, and block parties). When the average rate of traffic of the one or more vehicles 201, 205 (FIG. 2) included in the set of traffic data is lower than the average historical rate of vehicles 201, 205 (FIG. 2) on the road 306 (FIG. 3) at the particular time of day, then the traffic rate threshold can be satisfied.

Next, at 606, the camera sharing program 112A-D (FIG. 1) determines at least one alternate route. The at least one alternate route can be created based on the shortest total travel time or shortest travel distance. Moreover, determining at least one alternate route can be based on the received set of traffic data. Furthermore, determining at least one alternate route can be based on analyzing the historical records of traffic as well as historical records of a user preferences. Additionally, the at least one alternate route can be determined in response to a request for an alternate route by a user wanting to bypass a traffic congestion. The determined alternate routes can start at the current location of the vehicle (e.g., 201 (FIG. 2)) and end at any location entered by the user. The determined alternate routes can be based on an estimated duration to traverse the alternate route or on a confidence level of an amount of traffic along the route according to the historical records. Additionally, a user's preferred routes can be saved for future use when determining alternate routes.

Then, at 608, the camera sharing program 112A-D (FIG. 1) displays the at least one alternate route within a UI. The displayed alternate route can be in a form of an estimated duration of a particular route (e.g., in text). Moreover, the at least one alternate route can be displayed in the form of a map. The displayed map can include streets within the alternate route as highlighted in a preconfigured color (e.g. green or blue). The UI can be displayed by a client device 110A-C (FIG. 1) (e.g. a smart phone, desktop, and a laptop) and the UI can be interactive (e.g. a touchscreen device). Furthermore, the UI may be voice activated and may also respond to voice commands.

Next, at 610, the camera sharing program 112A-D (FIG. 1) displays a selected-alternate route within the UI based on a selection made by a user. The selected alternate route can be displayed based on the expiration of a time-based interval. For example, if the user did not select an alternate route within a minute, then the alternate route with the shortest travel time is automatically selected. Moreover, the selected-alternate route can be selected by a user utilizing the touch screen by pressing down on an alternate route or by an oral command. For example, the user can orally command that the route including the shortest total travel time be displayed within the UI.

It may be appreciated that FIGS. 2-6 provide only an illustration of at least one embodiment but do not imply any limitations with regard to how different embodiments may be implemented. Many modifications to the depicted embodiment(s) may be made based on design and implementation requirements.

Figure 7:
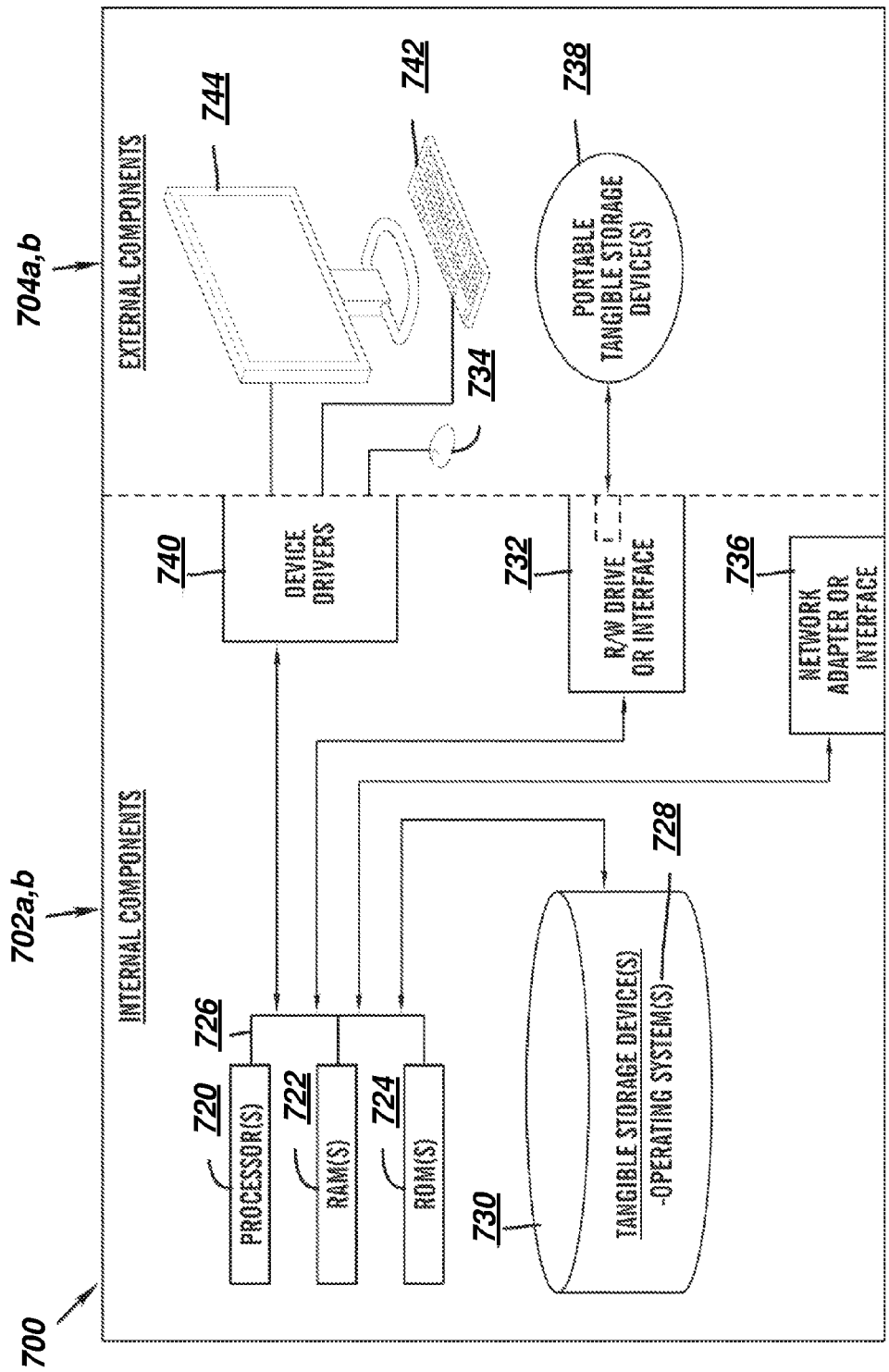
FIG. 7 is a block diagram of internal and external components of computers and servers depicted in FIG. 1 according to at least one embodiment.

In some embodiments, the operations and modules described herein can be included within and performed by components of a computer (e.g., a processor), such as the computer system described in FIG. 7.

FIG. 7 is a block diagram 700 of internal and external components of the client computing devices 110A-C and the server 120 depicted in FIG. 1 in accordance with an embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

The data processing system 702, 704 is representative of any electronic device capable of executing machine-readable program instructions. The data processing system 702, 704 may be representative of a smart phone, a computer system, PDA, or other electronic devices. Examples of computing systems, environments, and/or configurations that may represented by the data processing system 702, 704 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing devices 110A-C (FIG. 1) and the server 120 (FIG. 1) may include respective sets of internal components 702 a,b and external components 704 a,b illustrated in FIG. 7. Each of the sets of internal components 702 include one or more processors 720, one or more computer-readable RAMs 722 and one or more computer-readable ROMs 724 on one or more buses 726, and one or more operating systems 728 and one or more computer-readable tangible storage devices 730. The one or more operating systems 728, the camera sharing program 112A-C (FIG. 1) in the client computing devices 110A-C (FIG. 1), and the camera sharing program 112D (FIG. 1) in the server 120 (FIG. 1) are stored on one or more of the respective computer-readable tangible storage devices 730 for execution by one or more of the respective processors 720 via one or more of the respective RAMs 722 (which typically include cache memory). In the embodiment illustrated in FIG. 7, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

Each set of internal components 702 a,b also includes a R/W drive or interface 732 to read from and write to one or more portable computer-readable tangible storage devices 738 such as a CD-ROM, DVD, memory stick, magnetic tape, magnetic disk, optical disk or semiconductor storage device. A software program, such as the camera sharing program 112A-D (FIG. 1), can be stored on one or more of the respective portable computer-readable tangible storage devices 738, read via the respective R/W drive or interface 732 and loaded into the respective hard drive 730.

Each set of internal components 702 a,b also includes network adapters or interfaces 736 such as a TCP/IP adapter cards, wireless Wi-Fi interface cards, or 3G or 4G wireless interface cards or other wired or wireless communication links. The camera sharing program 112A-C (FIG. 1) in the client computing device 110A-C (FIG. 1) and the camera sharing program 112D (FIG. 1) in the server 120 (FIG. 1) can be downloaded to the client computing device 110A-C (FIG. 1), and the server 120 (FIG. 1) from an external computer via a network (for example, the Internet, a local area network or other, wide area network) and respective network adapters or interfaces 736. From the network adapters or interfaces 736, the camera sharing program 112A-C (FIG. 1) in the client computing device 110A-C (FIG. 1), and the camera sharing program 112D (FIG. 1) in the server 120 (FIG. 1) are loaded into the respective hard drive 730. The network may comprise copper wires, optical fibers, wireless transmission, routers, firewalls, switches, gateway computers and/or edge servers.

Each of the sets of external components 704 a,b can include a computer display monitor 744, a keyboard 742, and a computer mouse 734. External components 704 a,b can also include touch screens, virtual keyboards, touch pads, pointing devices, and other human interface devices. Each of the sets of internal components 702 a,b also includes device drivers 740 to interface to computer display monitor 744, keyboard 742, and computer mouse 734. The device drivers 740, R/W drive or interface 732 and network adapter or interface 736 comprise hardware and software (stored in storage device 730 and/or ROM 724).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
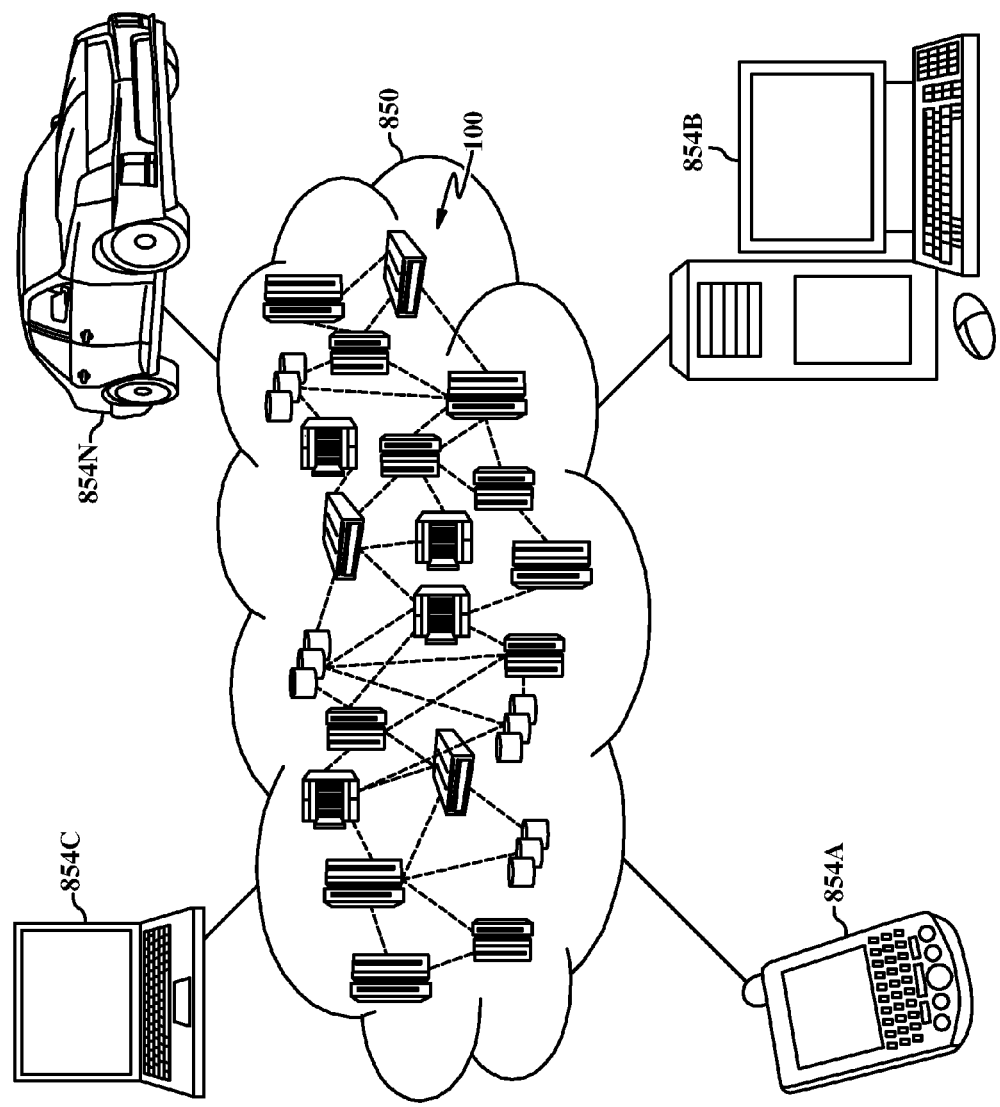
FIG. 8 is a block diagram of an illustrative cloud computing environment including the computer system depicted in FIG. 1, in accordance with an embodiment of the present disclosure.

Referring now to FIG. 8, illustrative cloud computing environment 850 is depicted. As shown, cloud computing environment 850 comprises one or more cloud computing nodes 100 with which local computing devices used by cloud consumers, such as, for example, personal digital assistant (PDA) or cellular telephone 854A, desktop computer 854B, laptop computer 854C, and/or automobile computer system 854N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 100 and cloud computing environment 850 can communicate with any type of computerized device over any type of network and/or network addressable connection (e.g., using a web browser).

Figure 9:
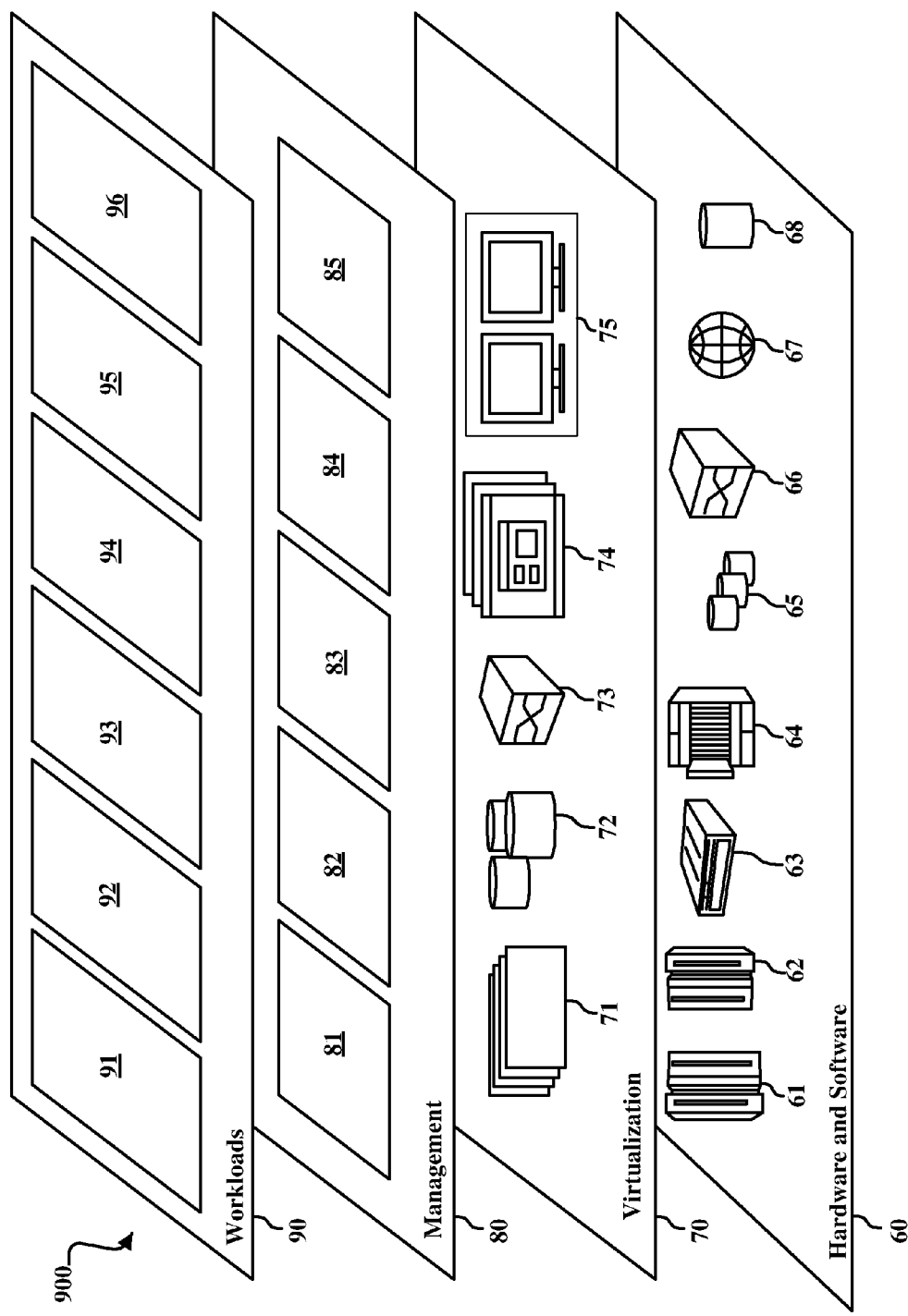
FIG. 9 is a block diagram of functional layers of the illustrative cloud computing environment of FIG. 8, in accordance with an embodiment of the present disclosure.

Referring now to FIG. 9 a set of functional abstraction layers 900 provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and camera sharing program 96. Camera sharing program 96 may refer to receiving a set of traffic data from a client device 110A (FIG. 1). The camera 118A (FIG. 1) could be collecting video footage from a viewpoint 215 (FIG. 2). The traffic data may be transmitted to a client device 110B (FIG. 1) for display within a UI located within a second vehicle 205 (FIG. 2).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method comprising:
receiving, by a processor, a first plurality of traffic data transmitted by a first client device associated with a first vehicle, wherein the first plurality of traffic data is image data and video data that is collected by a first camera attached to the first vehicle and associated with the first client device;
storing the received first plurality of traffic data in a database according to a license plate of the first vehicle;
receiving a second plurality of traffic data transmitted by a second client device associated with a second vehicle, wherein the second plurality of traffic data is image data and video data that is collected by a second camera attached to the second vehicle and associated with the second client device;
identifying an image of the license plate of the first vehicle within the received image data and video data of the second plurality of traffic data using at least one image recognition technique;
determining the identified license plate is stored in the database;
transmitting the image data and the video data of the first plurality of traffic data to the second client device based on determining the identified license plate is stored in the database;
displaying one or more vehicles represented as graphical images within a user interface (UI) associated with the second client device, wherein the first vehicle is included in the displayed one or more vehicles;
receiving, from a user located within the second vehicle, a first user selection of the first vehicle that is displayed within the UI;
displaying, within the UI, a viewpoint of the first camera;
receiving, from the user located within the second vehicle, a second user selection for the viewpoint of the first camera to be oriented for display within the UI; and
adjusting the position of the first camera so that the viewpoint of the first camera is oriented according to the received second user selection.

2. The method of claim 1, further comprising:
receiving a first geographic location of the first vehicle from the first client device; and
receiving a plurality of geographic locations of a plurality of other vehicles that each include an associated client device, wherein the displaying the one or more vehicles within the UI further includes:
displaying the received first geographic location and the received plurality of geographic locations of the plurality of other vehicles within a proximity of and in spatial relation to the first vehicle within the UI.

3. The method of claim 2, further comprising:
receiving a third user selection of a third plurality of traffic data; and
transmitting the third plurality of traffic data collected by a third camera attached to a third vehicle of the plurality of other vehicles associated with a third client device.

4. The method of claim 3, wherein the third user selection is from a user located within the first vehicle, further comprising:

receiving, from a second user located within the first vehicle, a fourth user selection of the third vehicle that is displayed within a second UI;
displaying, within the second UI, a viewpoint of the third camera;
receiving, from the second user located within the first vehicle, a fifth user selection for the viewpoint of the third camera to be oriented for display within the second UI; and adjusting the position of the third camera so that the viewpoint of the third camera is oriented according to the received fifth user selection.

5. The method of claim 1, further comprising:
comparing the first plurality of traffic data and the second plurality of traffic data to a plurality of historical traffic data;
determining that an average traffic rate associated with the first plurality of traffic data and the second plurality of traffic data satisfies a traffic rate threshold based on comparing the first plurality of traffic data and the second plurality of traffic data to the plurality of historical traffic data;
determining at least one alternate route based on determining that the average traffic rate associated with the first plurality of traffic data and the second plurality of traffic data satisfies the traffic rate threshold; and
displaying the determined at least one alternate route within the UI.

6. The method of claim 5, further comprising:
receiving an alternate route of the at least one alternate route within the UI in response to a fourth user selection; and
displaying a visual representation of the received alternate route within the UI.

7. The method of claim 5, further comprising:
determining that a predetermined amount of time has exceeded a predetermined time threshold, wherein the predetermined time threshold is an amount of time that the user has to select one of the determined at least one alternate route before a route is automatically selected;
selecting automatically an alternate route of the determined at least one alternate route that has the shortest travel time in response to the predetermined amount of time exceeding the predetermined time threshold; and
displaying the selected alternate route within the UI.

8. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving, by a processor, a first plurality of traffic data transmitted by a first client device associated with a first vehicle, wherein the first plurality of traffic data is image data and video data that is collected by a first camera attached to the first vehicle and associated with the first client device;
storing the received first plurality of traffic data in a database according to a license plate of the first vehicle;
receiving a second plurality of traffic data transmitted by a second client device associated with a second vehicle, wherein the second plurality of traffic data is image data and video data that is collected by a second camera attached to the second vehicle and associated with the second client device;

identifying an image of the license plate of the first vehicle within the received image data and video data of the second plurality of traffic data using at least one image recognition technique;
determining the identified license plate is stored in the database;
transmitting the image data and the video data of the first plurality of traffic data to the second client device based on determining the identified license plate is stored in the database;
displaying one or more vehicles represented as graphical images within a user interface (UI) associated with the second client device, wherein the first vehicle is included in the displayed one or more vehicles;
receiving, from a user located within the second vehicle, a first user selection of the first vehicle that is displayed within the UI;
displaying, within the UI, a viewpoint of the first camera;
receiving, from the user located within the second vehicle, a second user selection for the viewpoint of the first camera to be oriented for display within the UI; and
adjusting the position of the first camera so that the viewpoint of the first camera is oriented according to the received second user selection.

9. The computer system of claim 8, further comprising:
receiving a first geographic location of the first vehicle from the first client device; and
receiving a plurality of geographic locations of a plurality of other vehicles that each include an associated client device, wherein the displaying the one or more vehicles within the UI further includes:
  displaying the received first geographic location and the received plurality of geographic locations of the plurality of other vehicles within a proximity of and in spatial relation of the first vehicle within the UI.

10. The computer system of claim 9,
receiving a third user selection of a third plurality of traffic data; and
transmitting the third plurality of traffic data collected by a third camera attached to a third vehicle of the plurality of other vehicles associated with a third client device.

11. The system of claim 10, wherein the third user selection is from a user located within the first vehicle, further comprising:
receiving, from a second user located within the first vehicle, a fourth user selection of the third vehicle that is displayed within a second UI;
displaying, within the second UI, a viewpoint of the third camera;
receiving, from the second user located within the first vehicle, a fifth user selection for the viewpoint of the third camera to be oriented for display within the second UI; and adjusting the position of the third camera so that the viewpoint of the third camera is oriented according to the received fifth user selection.

12. The computer system of claim 8, further comprising:
comparing the first plurality of traffic data and the second plurality of traffic data to a plurality of historical traffic data;
determining that an average traffic rate associated with the first plurality of traffic data and the second plurality of traffic data satisfies a traffic rate threshold based on comparing the first plurality of traffic data and the second plurality of traffic data to the plurality of historical traffic data;
determining at least one alternate route based on determining that the average traffic rate associated with the first plurality of traffic data and the second plurality of traffic data satisfies the traffic rate threshold; and
displaying the determined at least one alternate route within the UI.

13. The computer system of claim 12, further comprising:
receiving an alternate route of the at least one alternate route within the UI in response to a fourth user selection; and
displaying a visual representation of the received alternate route within the UI.

14. The system of claim 12, further comprising:
determining that a predetermined amount of time has exceeded a predetermined time threshold, wherein the predetermined time threshold is an amount of time that the user has to select one of the determined at least one alternate route before a route is automatically selected;
selecting automatically an alternate route of the determined at least one alternate route that has the shortest travel time in response to the predetermined amount of time exceeding the predetermined time threshold; and
displaying the selected alternate route within the UI.

15. A computer program product, the computer program product comprising:
one or more computer-readable tangible storage medium and program instructions stored on at least one of the one or more tangible storage medium, the program instructions executable by a processor, the program instructions comprising:
program instructions to receive, by a processor, a first plurality of traffic data transmitted by a first client device associated with a first vehicle, wherein the first plurality of traffic data is image data and video data that is collected by a first camera attached to the first vehicle and associated with the first client device;
program instructions to store the received first plurality of traffic data in a database according to a license plate of the first vehicle;
program instructions to receive a second plurality of traffic data transmitted by a second client device associated with a second vehicle, wherein the second plurality of traffic data is image data and video data that is collected by a second camera attached to the second vehicle and associated with the second client device;
program instructions to identify an image of the license plate of the first vehicle within the received image data and video data of the second plurality of traffic data using at least one image recognition technique;
program instructions to determine the identified license plate is stored in the database;
program instructions to transmit the image data and the video data of the first plurality of traffic data to the second client device based on determining the identified license plate is stored in the database;
program instructions to display one or more vehicles represented as graphical images within a user interface (UI) associated with the second client device, wherein the first vehicle is included in the displayed one or more vehicles;
program instructions to receive, from a user located within the second vehicle, a first user selection of the first vehicle that is displayed within the UI;
program instructions to display, within the UI, a viewpoint of the first camera;
program instructions to receive, from the user located within the second vehicle, a second user selection for the viewpoint of the first camera to be oriented for display within the UI; and program instructions to adjust the position of the first camera so that the viewpoint of the first camera is oriented according to the received second user selection.

16. The computer program product of claim 15, further comprising:
program instructions to receive a first geographic location of the first vehicle from the first client device; and
program instructions to receive a plurality of geographic locations of a plurality of other vehicles that each include an associated client device, wherein the displaying the one or more vehicles within the UI further includes:
program instructions to display the received first geographic location and the received plurality of geographic locations of the plurality of other vehicles within a proximity of and in spatial relation to the first vehicle within the UI.

17. The computer program product of claim 16, further comprising:
program instructions to receive a third user selection of a third plurality of traffic data; and
program instructions to transmit the third plurality of traffic data collected by a third camera attached to a third vehicle of the plurality of other vehicles associated with a third client device.

18. The computer program product of claim 17, wherein the third user selection is from a user located within the first vehicle, further comprising
program instruction so receive, from a second user located within the first vehicle, a fourth user selection of the third vehicle that is displayed within a second UI;
program instructions to display, within the second UI, a viewpoint of the third camera;
program instructions to receive, from the second user located within the first vehicle, a fifth user selection for the viewpoint of the third camera to be oriented for display within the second UI; and program instructions to adjust the position of the third camera so that the viewpoint of the third camera is oriented according to the received fifth user selection.

19. The computer program product of claim 15, further comprising:
program instructions to compare the first plurality of traffic data and the second plurality of traffic data to a plurality of historical traffic data;
program instructions to determine that an average traffic rate associated with the first plurality of traffic data and the second plurality of traffic data satisfies a traffic rate threshold based on comparing the first plurality of traffic data and the second plurality of traffic data to the plurality of historical traffic data;
program instructions to determine at least one alternate route based on determining that the average traffic rate associated with the first plurality of traffic data and the second plurality of traffic data satisfies the traffic rate threshold; and
program instructions to display the determined at least one alternate route within the UI.

20. The computer program product of claim 19, further comprising:
program instructions to determine that a predetermined amount of time has exceeded a predetermined time threshold, wherein the predetermined time threshold is an amount of time that the user has to select one of the determined at least one alternate route before a route is automatically selected;
program instructions to automatically select an alternate route of the determined at least one alternate route that has the shortest travel time in response to the determined amount of time exceeding the predetermined time threshold; and
program instructions to display the selected alternate route within the UI.

* * * * *